(12) United States Patent
Bogdan

(10) Patent No.: US 10,095,916 B1
(45) Date of Patent: *Oct. 9, 2018

(54) FACIAL RECOGNITION USING FRACTAL FEATURES

(71) Applicant: MorphoTrust USA, LLC, Billerica, MA (US)

(72) Inventor: Alexandru Bogdan, New York, NY (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,383

(22) Filed: May 15, 2017

Related U.S. Application Data

(63) Continuation of application No. 14/984,454, filed on Dec. 30, 2015, now Pat. No. 9,652,664.

(60) Provisional application No. 62/097,950, filed on Dec. 30, 2014.

(51) Int. Cl.
*G06K 9/00* (2006.01)
*G06K 9/62* (2006.01)
*G06K 9/46* (2006.01)
*G06K 9/52* (2006.01)

(52) U.S. Cl.
CPC ..... *G06K 9/00288* (2013.01); *G06K 9/00248* (2013.01); *G06K 9/00268* (2013.01); *G06K 9/4614* (2013.01); *G06K 9/52* (2013.01); *G06K 9/6215* (2013.01); *G06K 9/6219* (2013.01)

(58) Field of Classification Search
USPC .................................................. 382/115–118
See application file for complete search history.

(56) References Cited

U.S. PATENT DOCUMENTS

| | | | | |
|---|---|---|---|---|
| 5,819,070 | A | * | 10/1998 | Sasaki ..................... G06T 17/20 345/420 |
| 6,931,145 | B1 | * | 8/2005 | Kroos ..................... G06T 7/207 382/107 |
| 7,035,467 | B2 | * | 4/2006 | Nicponski .......... G06K 9/00221 382/190 |
| 8,073,287 | B1 | * | 12/2011 | Wechsler ............... G06K 9/746 359/306 |
| 9,652,664 | B1 | * | 5/2017 | Bogdan .............. G06K 9/00288 |
| 2005/0201595 | A1 | | 9/2005 | Kamei |
| 2008/0222295 | A1 | | 9/2008 | Robinson et al. |

(Continued)

*Primary Examiner* — Alex Liew
(74) *Attorney, Agent, or Firm* — Fish & Richardson P.C.

(57) ABSTRACT

Methods, systems, and apparatus, including computer programs encoded on a computer storage medium, for facial recognition using fractal features are disclosed. In one aspect, a method includes the actions of accessing data encoding a facial image, the facial image including a face. The actions further include generating a hierarchical graphical model of the face in the facial image, the hierarchical graphical model including more than nodes from at least one level, each level approximating the face within a contour. The actions further include applying a bank of filters to the face at a particular node, each filter spanning more than one scale and at least one direction. The actions further include analyzing filter responses from the bank of filters applied at each direction to obtain a similarity measure that consolidates filter responses from filters applied at more than one scale. The actions further include generating a vector representation.

20 Claims, 7 Drawing Sheets

(56) References Cited

U.S. PATENT DOCUMENTS

| | | |
|---|---|---|
| 2012/0005209 A1 | 1/2012 | Rinearson et al. |
| 2013/0046761 A1 | 2/2013 | Söderberg et al. |
| 2013/0173531 A1 | 7/2013 | Rinearson et al. |
| 2013/0212477 A1 | 8/2013 | Averbuch |
| 2014/0019867 A1 | 1/2014 | Lehtiniemi et al. |
| 2014/0288917 A1 | 9/2014 | Orsini et al. |

* cited by examiner

FACIAL RECOGNITION USING FRACTAL FEATURES

CROSS REFERENCE TO RELATED APPLICATION

This application is a continuation of U.S. application Ser. No. 14/984,454, filed Dec. 30, 2015, which claims the benefit of U.S. Provisional Application Ser. No. 62/097,950, filed Dec. 30, 2014, which is incorporated by reference.

TECHNICAL FIELD

This disclosure generally relates to facial recognition.

BACKGROUND

Facial recognition technology has applications in a wide variety of areas. For example, facial recognition may be useful to identify pictures from surveillance cameras or in social media applications.

SUMMARY

This disclosure generally describes facial recognition using fractal features.

An innovative aspect of the subject matter described in this application may be implemented in a method of analyzing facial images that includes the actions of accessing data encoding a facial image, the facial image including a face; generating a hierarchical graphical model of the face in the facial image, the hierarchical graphical model including more than nodes from at least one level, each level approximating the face within a contour; applying a bank of filters to the face at a particular node, each filter spanning more than one scale and at least one direction; analyzing filter responses from the bank of filters applied at each direction to obtain a similarity measure that consolidates filter responses from filters applied at more than one scale; generating a vector representation based on the similarity measures to describe the facial image at the particular node; and storing, at a storage device, the generated vector representation from one or more node for computing a distance between two vector representations.

The method may include one or more of the following optional features. The similarity measure is a slope of a regression line that is based on the filter responses and a parameter of the bank of filters. The similarity measure is a y-intercept of a regression line that is based on the filter responses and a parameter of the bank of filters. The similarity measure is an error of a regression line that is based on the filter responses and a parameter of the bank of filters. The bank of filters are Gabor filters. The actions further include comparing the generated vector representation of the facial image with other generated vector representations of other facial images; determining that a difference between the generated vector representation of the facial image and another generated vector representation of a particular facial image of the other facial images satisfies a threshold; and designating the facial image and the particular facial image as images of a same person. The action of applying a bank of filters to the face at a particular node, each filter spanning more than one scale and at least one direction includes applying the bank of filters to the face at a particular node, each filter spanning four scales and twelve directions.

Other implementations include corresponding systems, apparatus, and computer programs encoded on computer storage devices configured to perform the above-noted actions.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

This disclosure generally describes facial recognition using fractal features.

According to implementations, a fractal framework may be used to generate additional features of a face image. The additional features may capture local scaling properties or changes across the scales of a Gabor representation, measured at each node in a face image. A significant improvement in face identification performance may be achieved by combining these additional features with data available in a Hierarchical Structure Graph Model (HGM) framework.

According to implementations, a method and device/system are disclosed which improve the performance of the facial recognition technologies based on the HGM framework. Images of two faces may be compared by computing a difference between two feature vectors. The two faces are determined to be matched when the difference between the two feature vectors satisfies a threshold. Additional information may be extracted from already computed HGM features to estimate signal changes as a function of scale and use the new feature vectors for facial recognition.

Figure 1A:
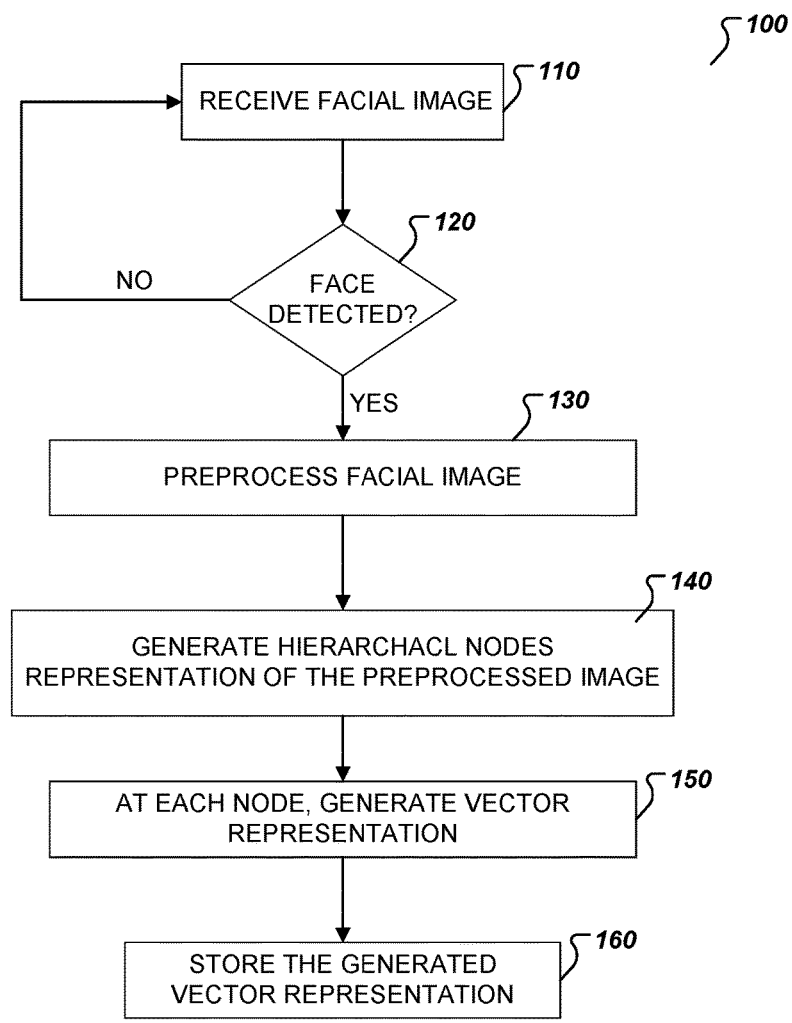
FIG. 1A is a flowchart illustrating an example of processing a facial image to extract features for facial recognition and store them in a vector.

FIG. 1A is a flowchart illustrating an example of processing a facial image to extract features for facial recognition. When an image is received by an electronic device (110), the image is scanned to determine whether a face is present in the image (120). The image may be captured by, for example, cameras, camcorders, charge-coupled device (CCDs). An example electronic device generally includes a processor and suitable memories. By virtue of being scanned, the image may be converted to a digital format for computerized processing. In general, various facial detection software tools, including, for example, libraries and codes on edge detection, segmentation, may be used to detect a face in an image. If no face is detected, the received image is not processed any further and the electronic device may wait to receive another file with a facial image.

In some implementations, the system may scan the image for particular features of a human face. For example, the system may scan the image for eyes or a mouth or both. To locate eyes in an image, the system may test all the valley regions in a gray level representation of the image. The system may then apply a face detection algorithm to locate the possible face regions that include eyebrows, irises, nostrils, and mouth corners. The system may normalize each possible candidate face to reduce any variance in lighting across the image. The system may iterate through the image several times, each time selecting the area that have the highest scores that reflect likely facial features. The system may identify areas of the image for further processing based on those areas as having scores that satisfy a particular threshold. The system may then further analyze those areas for different facial features before labeling an area as a face. For example, the system may have identified a region that is likely a face that includes two eyes and a mouth. The system may measure the distances between the two eyes and from each eye to the mouth. Based on the ratios of distances, the system may conclude that the region includes a face.

Some faces in images may not be directly facing the camera. For example, image may include a profile view of a person's face. The system may also be programmed to identify features of faces from different angles such as ears and noses. The system may also be programmed to identify faces when a person is between facing directly at the camera and facing directly to the side. In this instance, the system may key off distances from regions that likely correspond to the eyes, ears, mouth, and nose.

If a face is detected, the image may be preprocessed (130). Preprocessing may involve adjusting the image according to one or more adjustments. For example, the image may be scaled, rotated, or adjusted for brightness or contrast control. The image may be modified so that the detected face is in a particular position, size, or orientation. For instance, the image may be modified so that the detected face may be enlarged, reduced in size, or placed in a particular area of the image. In some implementations, preprocessing the image is an optional step, and, therefore, the received image may not be preprocessed.

As a more detailed example, an image may include a close up picture of a face, such as a picture that an individual took while pointing the camera at himself or herself. In this instance, the system may have identified a large oval shaped area in about the center of the image as including a face. The system may preprocess this image by cropping the image to only include the face region and a particular area around the face region. The system may adjust the brightness or contrast of the image to match that of other images that to which the system will eventually compare the face, such as images stored in an image database. The system may reduce the size of the image to match that of the images in the image database. The system may also rotate the image so that the face oriented straight.

As another detailed example, an image may include a person standing in front of a landmark such as a statue or sculpture. Based on skin tone, the system may determine that the face of the statue is not a face of a person because all colors on the statues face may be a similar color. The system may only detect the face of the person posing. Once the system detects the face, the system may enlarge the face to a size to match the images stores in the database. The system may also adjust the brightness or contract of the face region.

Once the system detects the faces in the images and optionally pre-processes the images, the system generates a hierarchical node representation of the pre-processed image (140). An example hierarchical node representation is illustrated in FIG. 3.

Figure 3:
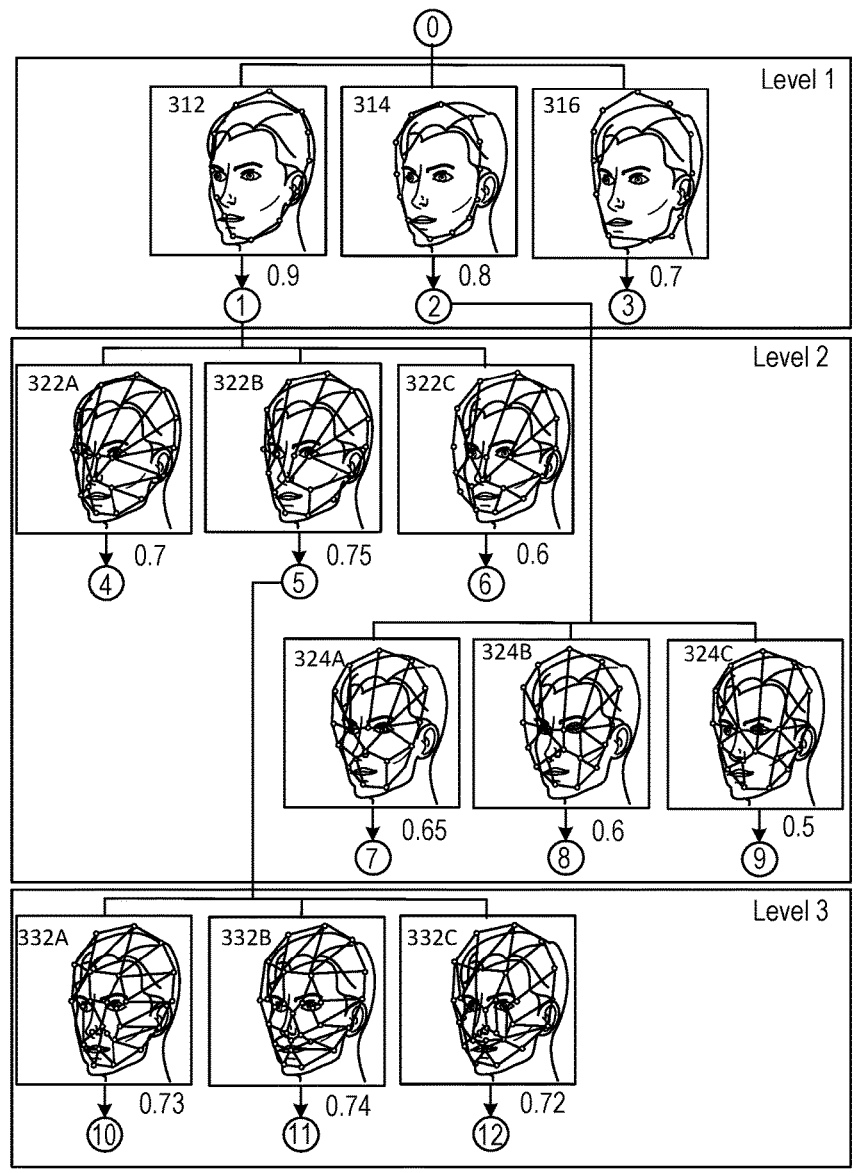
FIG. 3 illustrates an example of analyzing a facial image at various hierarchical nodes.

In FIG. 3, the hierarchical node representation includes three levels, Level 1, Level 2, and Level 3. Each level includes a number of different nodes that estimate the location of various features of the face. Level 1 includes three images 312, 314, and 316 that each include nodes that estimate a rough outline of the face. Each of the nodes is connected to neighboring nodes by an edge. Each of the images 312, 314, and 316 includes an assessment value. In the example shown in FIG. 3, the assessment value represents the accuracy of the position of the nodes with respect to the face. In some implementations, the assessment value may be based on other parameters such as scaling, rotation, or orientation. The assessment values for image 312 is 0.9, for image 314 is 0.8, and for image 316 is 0.7.

The system continues to build the hierarchical node representation based on the nodes and the respective assessments from Level 1. In some implementations, the system may continue to identify additional nodes using nodes whose assessments satisfy a particular threshold. In this example, the threshold may be 0.8 and thus the system continues to build the hierarchical node representation using image 312 and image 314 and their corresponding nodes and edges. In some implementations, the system continues to build the hierarchical node representation for all each of the images on a particular level. For example, the system may continue to build the hierarchical node representation using images 312, 314, and 316. In some implementations, the system selects the highest assessment for the level and continues to build the hierarchal node representation using the nodes form the image with the highest assessment. In this example selecting the image with the highest assessment will cause the system to select image 312.

In some implementations, the images that they system processes at each level are of different quality. The images processed at the first levels may be lower quality than the images processed at level 2 or level 3. The images processed at level 3 may be of the highest quality. To lower the image quality, the system may apply one or more filters to the image. The filters may decrease the amount of information in the image, but because the system is only searching for an outline of the face, the system may still be able to identify an approximate outline. Working with a lower quality image quickens the processing involved in identifying possible nodes.

In Level 2, the system identifies additional nodes in images 322a, 322b, and 322c. The additional nodes may correspond approximately to features of face such as the nose, mouth and eyes. The newly identifies nodes may be connected to some of the nearby nodes and in particular to nodes of the outside contour of the face. Based on the newly identified nodes, the system may compute an assessment of the nodes. As with level 1, the system computes an assessment based on the accuracy of the nodes for each image. For image 322a, the assessment is 0.7. For image 322b, the assessment is 0.75. For image 322c, the assessment is 0.6. All of these assessments are lower than the next highest assessment of 0.8 for image 314 in level 1. Therefore the process of identifying nodes in level 2 continues by processing image 314. The system identifies nodes for images 324a, 324b, and 324c based on the facial outline identified in image 314. The system computes an assessment for each of the images 324a, 324b, and 324c and identifies assessments of 0.65, 0.6, and 0.5, respectively. In comparing the assessments in level 2, the highest one is image 322*b*, which is one of the children of image 312.

In processing level 2, the system selected the highest assessment from level 1 to continue processing. In computing the assessments for images 322*a*, 322*b*, and 322*c*, the system determines that all the assessments were lower than the next highest assessment of the parent level. Therefore, the system continued processing the second highest assessment of level 1. In some implementations, if one or more of the assessment of the images 322*a*, 322*b*, and 322*c* was higher than the assessment of image 314, then the system would not identify nodes of images 324*a*, 324*b*, and 324*c* because the accuracy of the nodes for the level 2 images was improving with respect to the remaining level 1 images.

With the system having computed assessments for the images in level 2, the system select image 322*b*, which has the highest score in level 2. The system continues to identify additional nodes and edges in each of the images 332*a*, 332*b*, and 332*c*. The system computes an assessment for each of the images 332*a*, 332*b*, and 332*c* and each assessment is 0.73, 0.74, and 0.72, respectively. Unlike level 2, when each of the images 322*a*, 322*b*, and 322*c* corresponded to an assessment that was lower than the next highest assessment of level 1, the assessments of level 3 are not all lower than the next highest assessment of level 2. The next highest assessment of level 2 is 0.7, which corresponds to image 322*a*. An assessment of 0.7 is lower than each of the assessments in level 3.

The generation of the hierarchical node representation may continue for subsequent levels using a similar process as with levels 1 to 3. In some implementations, the each group of children images may be any number of images each with a group of nodes and edges. For example, level 1 may include four, five, or more images each with different nodes. Level 2 and 3 may also include additional images and corresponding nodes. In some implementations, the number of each children images that a parent image has may vary. For example, image 322*b* may include four child images. Image 314 may include five child images.

Once the system generates the hierarchical node representation, the method 100 continues to generate a vector representation for one or more nodes (150). To do so, the system first generates a filter bank that includes one or more filters to apply to the one or more nodes. In some implementations, the filter bank is includes one or more Gabor filters. A Gabor filter is a bandpass filter that may be used to extract various features or textures from an image. The impulse response of a Gabor filter is the multiplication of sinusoidal function and Gaussian envelope. In two dimensions, a Gabor filter is the multiplication of a two dimensional sinusoidal function oriented in a particular direction and Gaussian function that is associated with a particular scale. In some implementations, the scale may be related to a frequency of the sinusoidal function. The resulting Gabor filter is a sinusoidal function that is symmetrically decreasing in two opposite directions, with a peak value at the center of the Gaussian function.

A filter bank may include Gabor filters that are each associated with a different scale and orientation. For example, a filter bank may be associated with four scales and twelve orientations. The twelve orientations may be separated by thirty degrees so that the orientations are 0, 30, 60, 90, 120, 150, 180, 210, 240, 270, 300, and 330 degrees. In some implementations, the orientations need not be equally separated. The four scales may be one, two, three, and four. Similarly, the scales need not be equally separated. To visualize the resulting bank of filters may two dimensional gray-scale images may be used. Each visualization may include black and white stripes that are oriented in the direction of the orientation of the underlying sinusoid. The thickness of the black and white stripes is based on the scale. The larger the scale the wider the stripes. With four scales and twelve orientations, there are forty-eight filters total in the filter bank.

The system applies the filter bank to each node (152). For example, the system may apply the filters to the nodes on image 332B. In some implementations, other images on different levels or on the same level may be selected. Image 332B may be selected because it is the image on the highest level with the highest score. The system applies each filter of the filter bank to each node of image 332B. In applying the filter bank, the system computes a Gabor Transform value for each scale and orientation combination. The system computes a Gabor Transform value for at least two scales and one orientation. For example, at the point on the left eye, the system may compute that the Gabor Transform values for the thirty degree orientation as 105 for scale 1, 320 for scale 2, 976 for scale 4, and 10,231 for scale 10. The system computes similar sets of values for the remaining orientations. In some implementations, the system repeats these computations for the other nodes identified in the image. For example, the system may repeat the computations for about two hundred nodes on image 332B.

In other words, at each node, a Gabor filter is applied to calculate a filter response for at least two quantization scales and one spatial direction to generate processed results on these scales and along the direction(s). The Gabor transform representation of the face image obtained by applying the Gabor filter is then measured at each node and provides a value for the HGM feature at the node. A Gabor transform representation generally includes four scale levels and twelve independent spatial directions for a total of forty-eight filters. Therefore, at each node, forty-eight HGM features may be generated. Each HGM feature is indexed by scale, spatial direction, and node position.

Figure 1B:
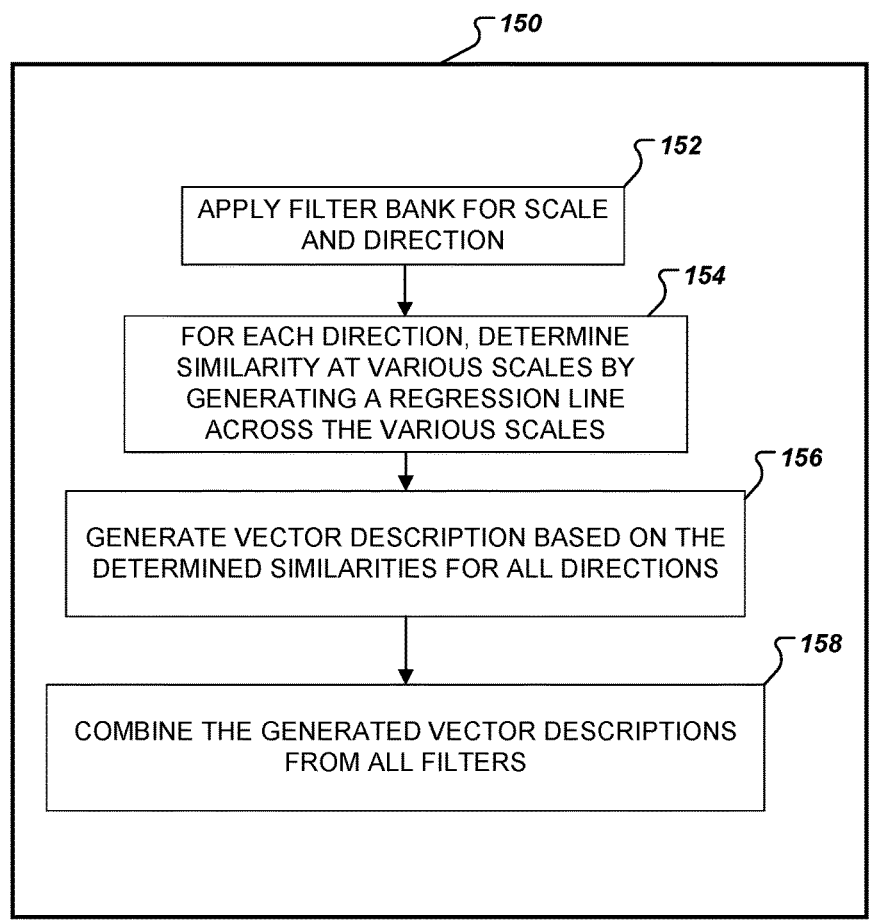
FIG. 1B is a flowchart illustrating an example of generating a vector representation that captures the similarity across different scales.
Figure 1C:
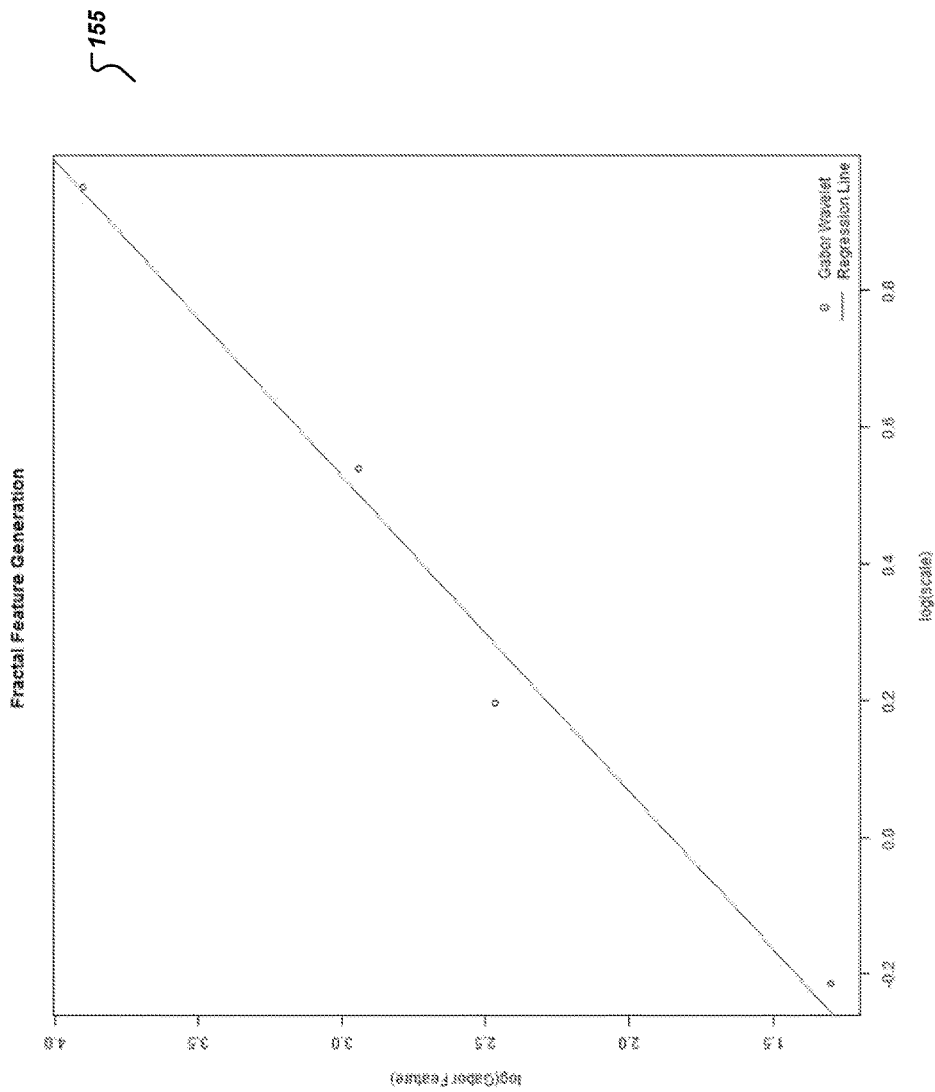
FIG. 1C shows an example of a scale regression analysis when generating a vector representation

Once the system completes the computations of the Gabor Transform value, the system generates plots for each of the different orientations. For one orientation and one node, the system generates a set of scale, Gabor Transform value pairs. The system plots, on a log-log two dimensional graph, the scale, Gabor Transform value pairs. The x-axis is the logarithm of the scale. The y-axis is the log of the Gabor Transform value. The system then computes a linear regression line that best fits the scale, Gabor Transform value pairs on the log-log plot using a fractal framework. An example plot is illustrated in FIG. 1C.

In a theoretical fractal framework, scaling properties are measured using the similarity dimension D. Similarity connects a measured quantity Ns, and the scale s at which it is measured. The similarity dimension D can be estimated from the (log (1/s), log (Ns)) plot of the data. For the perfect fractal, the plot is a straight line and D is the line slope. The plot of real data with fractal properties will be close to a line. D can be estimated from the slope of the regression line which best fits the data over a finite range of scales s. A best fit may generally correspond to a fit resulting in the difference between the data points and the fitted line in a least mean square sense.

According to implementations, the regression line may be determined by approximating the logarithmic plot of the Gabor Transform values against the scale parameters used in the transform filters. These Gabor Transform values are the HGM features at the same node and fix spatial direction.

Three parameters of the regression line, namely, slope, intercept of the vertical axis, and a measure of approximation of the data, are the new HGM fractal features.

With the regression line calculated, the system stores the y-intercept, slope, and the error (154). In some implementations, the error is the sum of the distances between the regression line and the plotted values, the residual, the mean square error, or the sum of squares errors. For each direction of each node, the slope, the vertical axis (response level) intercept, and a measure of the error between the approximation by the regression line and the actual response values of the filter are concatenated as a feature vector to generate a fractal description of the face. Therefore, each orientation of the filter bank is associated with three new values. For example, the thirty degree orientation, at the left eye, is now associated with y-intercept of 1.25, a slope of 2, and an error of 0.4. The system stores a vector that includes value for thirty degrees, left eye (e.g., the coordinates that correspond to the left eye location), y-intercept of 1.25, slope of 2, and error of 0.4. The system stores similar vectors for each of the different orientations and each of the nodes on the image (156). Therefore, if the image includes two hundred nodes, and the filter bank included twelve orientations, then the system will store twenty-four hundred vectors that each include a y-intercept, slope, and error that were derived from a linear regression line. The system then combines the generated vectors and stores them (158 and 160).

This fractal description can be combined with the original Gabor filter response values for facial recognition. The feature vector may be used the same way a HGM feature vector may be used in biometric identification. The feature vector is combined with the HGM feature vector for improved accuracy and identification performance of facial recognition.

This process may be repeated for a second image (210). In some implementations, the system accesses data for a second image from a database of other images that each include corresponding y-intercept, slope, and error vectors for each filter orientation and node location. This database may include images that the system has previously processed. The system compares the vectors of the second image with the vectors of the detected image that were calculated above (220). The system determines whether the two images likely match (240) or do not likely match (250). To determine whether two images likely match or not, the system may compare the values of the two vector representations of the images. If the differences between the vector representations is less than a threshold, then the two images are likely of the same person. If the differences between the vector representations is greater than the threshold, then the two images are not likely of the same person.

In some implementations, the second face and the extracted features and fractal description of the second face may be retrieved from a storage unit (e.g., memory) of the electronic device. In some implementations, a second image may be received by the electronic device and the second face and the extracted features and fractal description of the second face may be determined using the same method described in FIGS. 1A and 1B. The electronic device may receive the second image through various suitable methods including, for example, taking a picture using an image acquisition device (e.g., camera), downloading an image from a network (e.g., Internet), and receiving an image through an email, message, or data packet.

It should be appreciated that comparisons other than feature vector comparisons may also be performed. For instance, in some cases, the Gabor filter response values of the two faces may be compared.

Figure 2A:
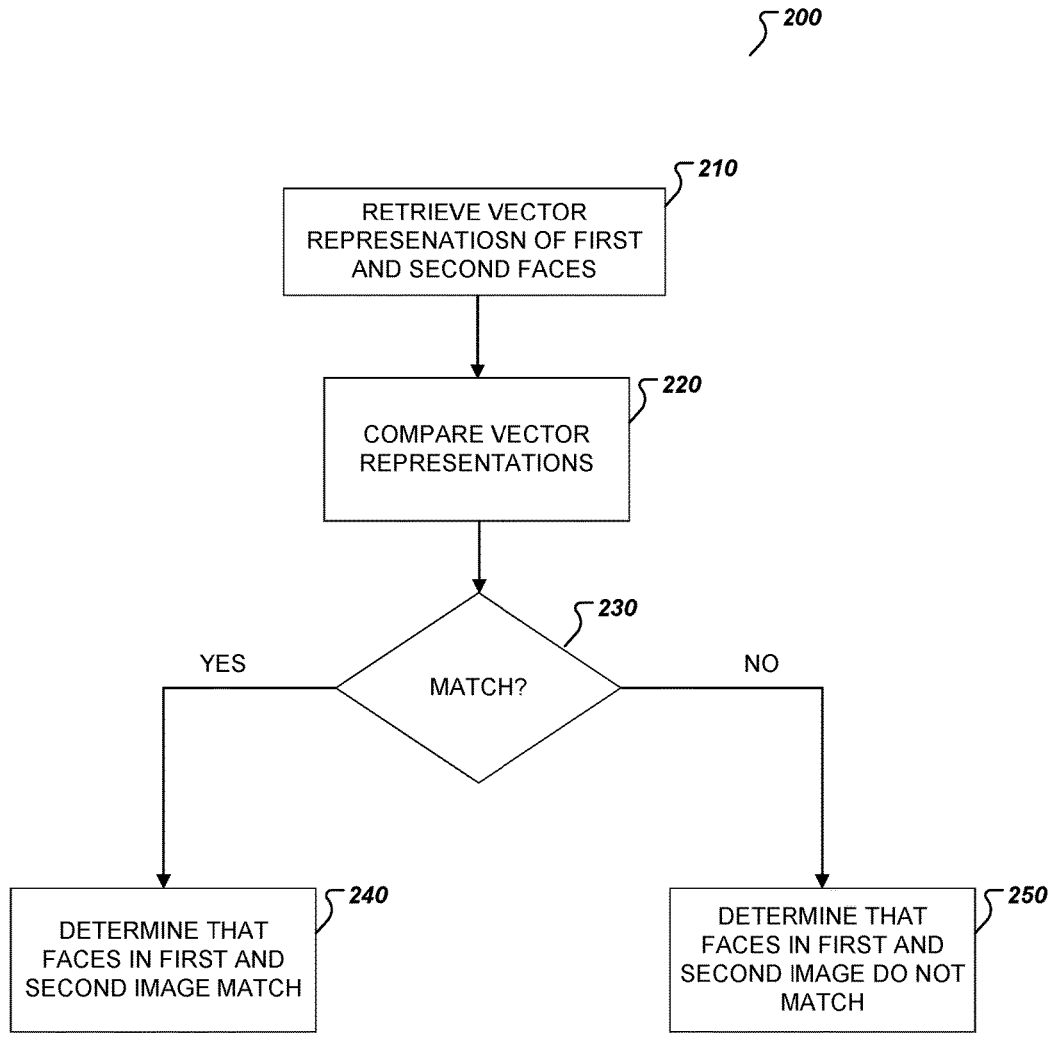
FIG. 2A is a flowchart illustrating an example of extracting facial recognition by matching the vector representations of facial images.
Figure 2B:
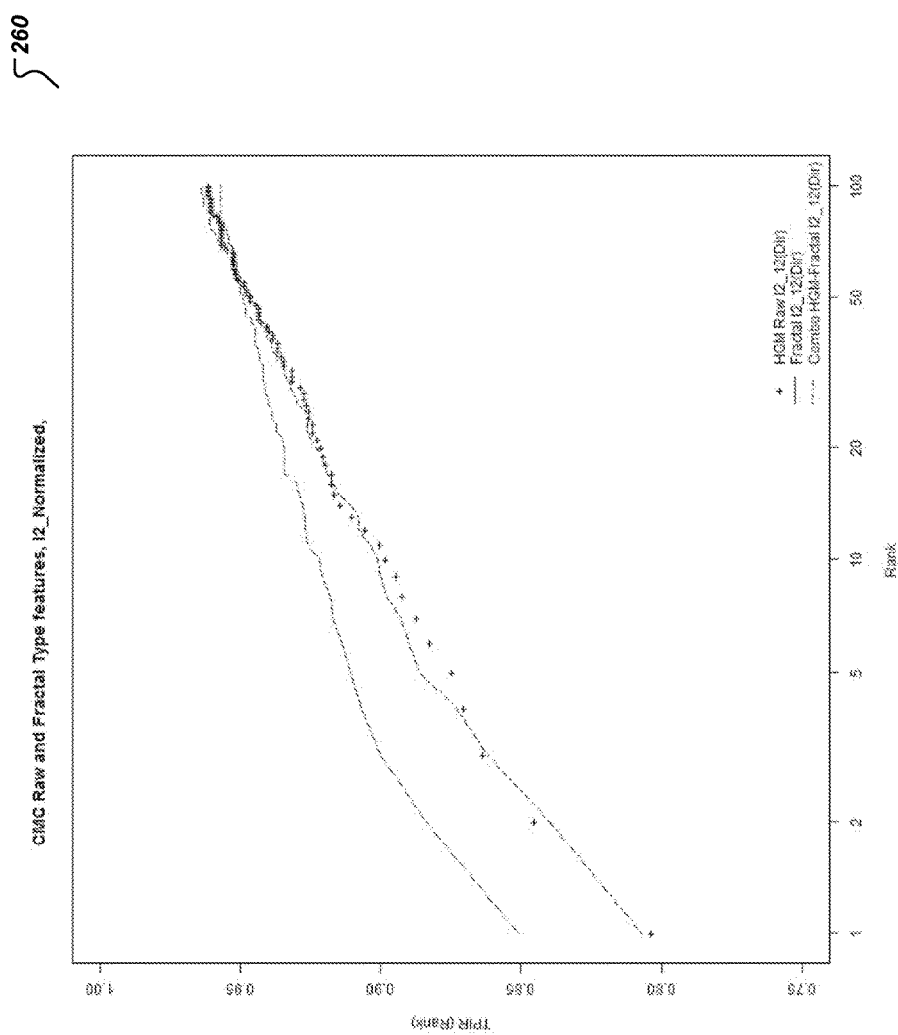
FIG. 2B summarizes an example performance measure CMC (Cumulative Match Characteristic) that shows the percentage of correct classified faces as a function of rank in an identification setting.

According to the implementations described above, a fractal framework may be used to generate additional features of a face image. The additional features may capture local scaling properties or changes across the scales of the Gabor representation, measured at each landmark point. A significant improvement in face identification performance may be achieved by combining these additional features with other data available in HGM frameworks as illustrated in FIG. 2B.

Figure 4:
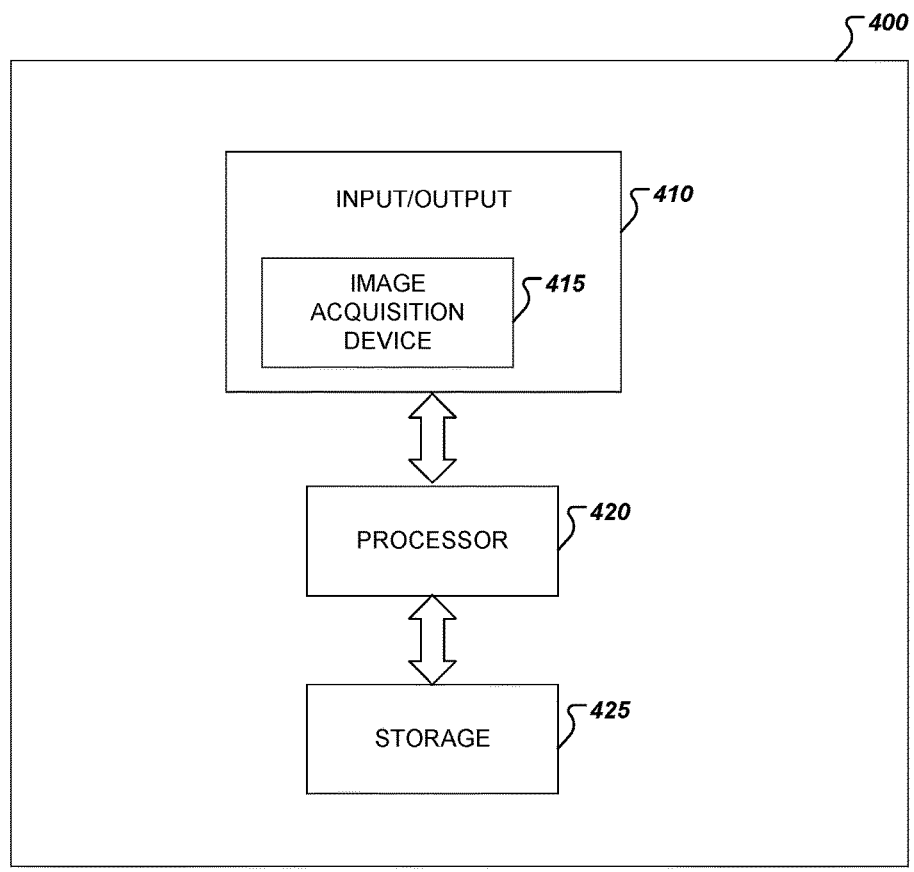
FIG. 4 depicts an exemplary processing device.

The above-described methods may be implemented in one or more of digital electronic circuitry, software, firmware, or hardware, or any combinations thereof in the electronic device 400 illustrated in FIG. 4. The electronic device 400 may include an input/output 410, processor 420, and storage 425.

The above-described implementations may be executed by one or more computer program products (e.g., one or more modules of computer program instructions encoded on a computer-readable medium) executed by processor 420. The computer-readable medium may be a machine-readable storage device, a machine-readable storage substrate, a memory device, a composition of matter effecting a machine-readable propagated signal, or a combination of one or more of them. Processor 420 encompasses all apparatus, devices, and machines for processing data, including by way of example a programmable processor, a computer, or multiple processors or computers. The processor 420 may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processor 420 may include one or more programmable processors executing one or more computer programs to perform the above-noted methods. The processor 420 may also be implemented as, special purpose logic circuitry, e.g., an FPGA (field programmable gate array) or an ASIC (application specific integrated circuit). Processor 420 may include both general and special purpose microprocessors, and any one or more processors of any kind of digital computer. Generally, a processor will receive instructions and data from storage 425 (e.g., read only memory, random access memory, or both) and input/output 410.

Storage 425 may include one or more memory devices for storing instructions and data. Generally, storage 425 may also include, or be operatively coupled to receive data from or transfer data to, or both, one or more mass storage devices for storing data, e.g., magnetic, magneto optical disks, or optical disks.

Storage 425 may store instructions for executing the implementations described above and computer-readable media including the instructions. Computer-readable media suitable for storing computer program instructions and data may include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor 420 and storage 425 may be supplemented by, or incorporated in, special purpose logic circuitry.

Storage 425 may store any data processed by the electronic device 400 including images, detected faces, and features of the faces, as described hereinabove. Storage 425 may include any type of database, including a cloud database or a database managed by a database management system (DBMS). In general, a cloud database may operate on platforms such as Python, Amazon EC2™, GoGrid®, Salesforce®, Rackspace®, and Microsoft® Azure™. A DBMS may be implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Oracle® database, IBM® DB2, Adaptive Server Enterprise, FileMaker®, Microsoft® Access®, Microsoft® SQL Server, MySQL™, PostgreSQL®, and a NoSQL implementation. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

The input/output 410 may be any hardware, software, module configured to provide data to and from the processor 420. Input of the input/output 410 may include, for example, one or more of an image acquisition device 415 (e.g., camera), a keyboard, a mouse, a touch pad, a receiver, and a virtual input interface. The receiver may receive one or more signals from another device, a network, or other modules. Input from a user may be received in any form, including acoustic, speech, or tactile input Output of the input/output 410 may include, for example, one or more of a display (e.g., a cathode ray tube (CRT), liquid crystal display (LCD), or light emitting diode (LED) monitor) and a transmitter or module to send data to other devices, networks, or modules. Other kinds of devices may be used to provide for interaction with a user as well; for example, feedback provided to the user may be any form of sensory feedback, e.g., visual feedback, auditory feedback, or tactile feedback.

Examples of the electronic device 400 include, but are not limited to, a computer, lap top, desktop, personal digital assistant, electronic pad, electronic notebook, mobile phone (e.g., smart phone), smart television, smart watch, smart glasses, network appliance, media player, navigation device, game console, and server. Electronic device 400 may be connected to one or more networks (not shown).

In some implementations, the electronic device 400 may also be implemented as a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other. The computing system may be connected to one or more networks (not shown).

The one or more networks may provide network access, data transport, and other services to the computing system. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The server in the computing system may run an operating system, examples of which include, but are not limited to, Microsoft® Windows® Server, Novell® NetWare®, or Linux®. The server may, in some cases, be used for and/or provide cloud and/or network computing. Although not shown in the figures, the server may have connections to external systems providing messaging functionality such as e-mail, SMS messaging, text messaging, and other functionalities, such as advertising services, search services, etc.

Data may be sent and received from the electronic device 400 using any technique for sending and receiving information between processes or devices including, but not limited to, using a scripting language, a remote procedure call, an email, an application programming interface (API), Simple Object Access Protocol (SOAP) methods, Common Object Request Broker Architecture (CORBA), HTTP (Hypertext Transfer Protocol), REST (Representational State Transfer), any interface for software components to communicate with each other, using any other known technique for sending information from a one device to another, or any combination thereof.

While this specification contains many specifics, these should not be construed as limitations on the scope of the disclosure or of what may be claimed, but rather as descriptions of features specific to particular implementations. Certain features that are described in this specification in the context of particular implementations may also be implemented in combination with other implementations. Various features that are described in the context of a single implementation may be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. In certain circumstances, multitasking and parallel processing may be advantageous. Moreover, the separation of various components in the implementations described above should not be understood as requiring such separation in all implementations, and it should be understood that the described program components and systems may be integrated together in a single software product or packaged into multiple software products.

A number of implementations have been described hereinabove. However, it should be understood that various modifications may be made without departing from the spirit and scope of the disclosure. Accordingly, other implementations are within the scope of the disclosure and claims.

What is claimed is:

1. A computer-implemented method comprising:
   accessing data encoding a facial image that includes a face;
   generating a hierarchical graphical model of the face, the hierarchical graphical model including a node from a level that approximates the face within a contour;
   applying, to the node, a bank of filters that each correspond to a respective scale and a respective direction;
   determining a similarity measure that consolidates filter responses from the bank of filters by analyzing the filter responses from the bank of filters;
   based on the similarity measure, generating, for the node, a vector representation that represents the facial image at the node; and
   storing the vector representation.

2. The method of claim 1, wherein the similarity measure is a slope of a regression line that is based on the filter response and a parameter of the bank of filters.

3. The method of claim 1, wherein the similarity measure is a y-intercept of a regression line that is based on the filter response and a parameter of the bank of filters.

4. The method of claim 1, wherein the similarity measure is an error of a regression line that is based on the filter response and a parameter of the bank of filters.

5. The method of claim 1, wherein the bank of filters are Gabor filters.

6. The method of claim 1, comprising:
   comparing the vector representation of the facial image to another vector representation of another facial image;
   determining that a difference between the vector representation of the facial image and the vector representation of the other facial image satisfies a threshold; and
   designating the facial image and the other facial image as images of a same person.

7. The method of claim 1, wherein applying, to the node, the bank of filters that each correspond to the respective scale and the respective direction comprises:
   applying, to the node, the bank of filters that each correspond to four additional scales and twelve additional directions.

8. A system comprising:
   one or more computers and one or more storage devices storing instructions that are operable, when executed by the one or more computers, to cause the one or more computers to perform operations comprising:
      accessing data encoding a facial image that includes a face;
      generating a hierarchical graphical model of the face, the hierarchical graphical model including a node from a level that approximates the face within a contour;
      applying, to the node, a bank of filters that each correspond to a respective scale and a respective direction;
      determining a similarity measure that consolidates filter responses from the bank of filters by analyzing the filter responses from the bank of filters;
      based on the similarity measure, generating, for the node, a vector representation that represents the facial image at the node; and
      storing the vector representation.

9. The system of claim 8, wherein the similarity measure is a slope of a regression line that is based on the filter response and a parameter of the bank of filters.

10. The system of claim 8, wherein the similarity measure is a y-intercept of a regression line that is based on the filter response and a parameter of the bank of filters.

11. The system of claim 8, wherein the similarity measure is an error of a regression line that is based on the filter response and a parameter of the bank of filters.

12. The system of claim 8, wherein the bank of filters are Gabor filters.

13. The system of claim 8, wherein the operations further comprise:
   comparing the vector representation of the facial image to another vector representation of another facial image;
   determining that a difference between the vector representation of the facial image and the vector representation of the other facial image satisfies a threshold; and
   designating the facial image and the other facial image as images of a same person.

14. The system of claim 8, wherein applying, to the node, the bank of filters that each correspond to the respective scale and the respective direction comprises:
   applying, to the node, the bank of filters that each correspond to four additional scales and twelve additional directions.

15. A non-transitory computer-readable medium storing software comprising instructions executable by one or more computers which, upon such execution, cause the one or more computers to perform operations comprising:
   accessing data encoding a facial image that includes a face;
   generating a hierarchical graphical model of the face, the hierarchical graphical model including a node from a level that approximates the face within a contour;
   applying, to the node, a bank of filters that each correspond to a respective scale and a respective direction;
   determining a similarity measure that consolidates filter responses from the bank of filters by analyzing the filter responses from the bank of filters;

based on the similarity measure, generating, for the node, a vector representation that represents the facial image at the node; and storing the vector representation.

16. The medium of claim 15, wherein the similarity measure is a slope of a regression line that is based on the filter response and a parameter of the bank of filters.

17. The medium of claim 15, wherein the similarity measure is a y-intercept of a regression line that is based on the filter response and a parameter of the bank of filters.

18. The medium of claim 15, wherein the similarity measure is an error of a regression line that is based on the filter response and a parameter of the bank of filters.

19. The medium of claim 15, wherein the bank of filters are Gabor filters.

20. The medium of claim 15, wherein the operations further comprise:

comparing the vector representation of the facial image to another vector representation of another facial image;

determining that a difference between the vector representation of the facial image and the vector representation of the other facial image satisfies a threshold; and designating the facial image and the other facial image as images of a same person.

* * * * *